United States Patent Office 3,493,401
Patented Feb. 3, 1970

3,493,401
FIRE RESISTANT COATING COMPOSITION
John B. Schutt and John W. Stuart, Silver Spring, Md., assignors to the United States of America as represented by the Administrator of the National Aeronautics and Space Administration
No Drawing. Filed Nov. 28, 1967, Ser. No. 686,296,
Int. Cl. C09d 5/18, 5/00
U.S. Cl. 106—15          9 Claims

ABSTRACT OF THE DISCLOSURE

Fire resistant coating compositions which, when dried, are flake, crack, craze and abrasion resistant and of greatly reduced leachability, comprising a combination of potassium silicate solution having a silicon dioxide to potassium oxide mol ratio of about 4.8 to 5.3, ceric oxide and/or an alkyl trialkoxy silane as rehydration suppressants, and wollastonite as a film builder, said composition being combinable with selected conventional pigments and fillers.

---

The invention herein described was made by employees of the United States Government and may be manufactured and used by or for the Government for governmental purposes without the payment of any royalties thereon or therefor.

SUMMARY OF DISCLOSURE

This invention relates to coating compositions, and more particularly to combinations of inorganic materials for such compositions which are both fireproof and insoluble in water after application. Specifically, this invention defines a unique combination of potassium silicate with other materials to produce a superior coating for space vehicles and the like.

DISCLOSURE

The development of inorganic coating materials for fire protection and the like has recently become a major effort of many researches, particularly those providing paints and other surface finishes for space vehicles. These efforts have been accelerated since the Apollo program tragedy, the severity of which resulted to some degree from the use of non-fireproof coating materials within the space capsule. The research with inorganic, basically fireproof materials has produced a number of quite useful compositions, many of which have already found application in space as well as other fields where fireproofing is so essential. These compositions have combined many inorganic materials in various proportions to produce the desired effects, but to the present no completely satisfactory coating material has been forthcoming. This is principally due to the multiplicity of properties necessary for such a coating and the difficulty of finding fireproof inorganic materials which, when combined, will produce such properties. Such properties include, inter alia, quick air drying, crack and craze resistance, substantial water insolubility when dried, ability to retain pigment, minimal flaking, abrasion resistance, and of course fire resistance. Many inorganic materials possess one or more of these properties and attempts have been made to combine them with other materials to produce the desired effects, but even with such multi-component complex compositions, all of the above defined desideratum have not been met.

Therefore, it is an object of the present invention to provide an inorganic fireproof composition which will be quick drying in air, crack and craze resistant and substantially water insoluble when dried.

It is a further object to provide such a composition which will retain conventional pigments, exhibit minimal flaking and be abrasion resistant.

It is still a further object of this invention to provide a fireproof inorganic coating which is composed of a minimal number of components which interact to produce the desired effects.

These and other objects will become apparent from the following detailed description, examples and claims.

It has been discovered that a composition containing a combination of potassium oxide and silicon dioxide in mol ratios of ($SiO_2/K_2O$) of 4.8–5.3 together with fibrous calcium silicate (wollastonite) as a crack and craze suppressant and silica insolubilizer and ceric oxide, alkyl trialkoxy silane, the alkyl and alkoxy groups having up to 8 carbon atoms and mixtures thereof as rehydration suppressants provide the desired effects. Preferably, the composition includes talc and/or kaolinite to enhance crack and craze suppression. To this basic composition may be added conventional pigments, fillers, property enhancers and of course the carrier material, generally water.

The combination of potassium oxide with silica, i.e. potassium silicate, has been used extensively in inorganic coatings. However, such compositions have been limited to standard commercial ratios of silica to potassium oxide, the maximum of such ratio on a mol basis being 3.9. By so doing, an excess of fully hydrated silica was never present to any substantial degree. By eliminating un-ionized base by raising the $SiO_2$ to $K_2O$ ratio substantially above 3.9, it has been found that, not only is the desired dispersion effect obtained, which made the potassium silicate necessary in the first place, but a coating of diminished leachability is provided due to the interaction of the excess silicic acid anions with the other composition components as described hereinafter.

The rehydration suppressant noted above reacts as follows after the coating has been applied. If, for example, ceric oxide is the additive, it reacts with the excess silica and/or potassium (produced from silica bonding) to produce hydrates which, although soluble in the water solution, form upon drying the insoluble compound cerium-potassium silicate due to the loss of water of hydration. However, this drying reaction is not reversible, so once the drying has occurred, the coating is substantially insoluble. The minimal leaching of still available soluble potassium silicate is of no substantial consequence, for the cerium silicate maintains the coating. The addition of alkyl alkoxy silane such as methyltrimethoxysilane also tends to diminish leaching of the coating after application and drying. Here the silane provides sites for attachment of silicic acid groups, the silane being non-water soluble due to the methyl groups, serving to bind any water soluble groups thereto, the combination thereof also being water insoluble. Thus, leaching of the coating after application and drying is suppressed.

Although this concept appears to solve the problem of making the coating resistant to water, abrasions, and of course fire, it does not alleviate the cracking and crazing so prevalent in inorganic coatings. To this end it has been discovered that the mineral wollastonite (fibrous calcium silicate) may be added and a product obtained which, after drying, is not only crack and craze resistant but also water insoluble. Wollastonite appears in the form of rod-like structures which serve as a binder between the silicate compounds discussed above. Although no complete evaluation has been conducted to determine the exact mechanisms which provide the high degree of crack and craze resistance obtained through the use of wollastonite, it may be hypothesized that the long, rod-like structures containing branching silicate groups form ready sites for attachment of the available anions in solution and in so doing serve to form a chemical ionic bond between all of the composition components. This bonding within the intertwined and overlapping fiber structures of wollastonite serve to hold each of the multiplicity of components in place after drying has occurred.

To this basic composition, it is preferred to add a supplemental binder-filler selected from kaolinite, talc, and combinations thereof. These are most desirable where fast furnace drying is utilized or the composition is to be applied to structures subjected to high temperatures, the talc and kaolinite serving to further suppress any cracking or crazing of the coating.

The addition of supplemental complemental components to the basic composition may be effected by simple addition thereof during solution blending. Such aditives include standard pigments and fillers as well as compounds having unique enchancement effects to the above noted critical components. Typical fillers include other clay-like materials, metals including zinc dust, stainless steel flakes, etc. Pigments such as the oxides of titanium, iron, copper, chromium and manganese as well as cadmium sulfide or carbon black may be used, while organic dyes are also contemplated, but not preferred due to their low decomposition temperature.

Having described the components of the invention, following is a generic table as well as specific examples of the practice thereof:

| Ingredient— | Relative parts percent by weight |
|---|---|
| Potassium silicate sol. 10–24 [1] K 4.8–5.3 [2] | 36–80 |
| Ceric oxide | [3] 0–10 |
| Methyl trimethoxy silane | [3] 0–2.6 |
| Wollastonite | 5–15 |
| Talc | 0–10 |
| Kaolinite | 0–7.5 |
| Pigments and fillers | 0–60 |
| Water | 0–10 |

[1] Percent solids in water solv.
[2] Mol ratio $SiO_2/K_2O$.
[3] At least one present in amounts of at least 1 part by weight—total maximum parts by weight of combination: 10.

Specific examples within this range are:

EXAMPLE I

| Ingredient | Parts by weight | Percent by weight |
|---|---|---|
| Potassium Silicate (23 K 5.1) | 100 | 75.7 |
| Ceric Oxide ($CeO_2$) | 2 | 1.5 |
| Wollastonite ($CaSiO_3$) | 16 | 12.2 |
| Kaolinite | 9 | 6.8 |
| Water | 5 | 3.8 |
| | 132 | 100.0 |

EXAMPLE II

| Ingredient | Parts by weight | Percent by weight |
|---|---|---|
| Potassium Silicate (23 K 5.1) | 100 | 36.8 |
| $CeO_2$ (Ceric Oxide) | 2 | .7 |
| Wollastonite ($CaSiO_3$) | 16 | 5.9 |
| Kaolinite | 9 | 3.3 |
| Water | 5 | 1.8 |
| Zn | 140 | 51.5 |
| | 272 | 100.0 |

EXAMPLE III

| Ingredient | Parts by weight | Percent by weight |
|---|---|---|
| Potassium Silicate (23 K 5.3) | 50 | 78.8 |
| Ceric Oxide ($CeO_2$) | 1 | 1.6 |
| Wollastonite ($CaSiO_3$) | 8 | 12.6 |
| Kaolinite | 4.5 | 7.1 |
| | 63.5 | 100.1 |

EXAMPLE IV

| Ingredient | Parts by weight | Percent by weight |
|---|---|---|
| Potassium Silicate (23 K 5.1) | 100 | 66.0 |
| Wollastonite ($CaSiO_3$) | 16 | 10.6 |
| Kaolinite | 9 | 6.0 |
| Stainless Steel Flakes | 20 | 13.2 |
| Methyl Trimethoxy Silane (dilute) | 4 | 2.5 |
| Talc | 2.5 | 1.7 |
| | 151.5 | 100.0 |

EXAMPLE V

| Ingredient | Parts by weight | Percent by weight |
|---|---|---|
| Potassium Silicate (23 K 5.3) | 100 | 74.8 |
| Wollastonite ($CaSiO_3$) | 16 | 12.0 |
| Kaolinite | 9 | 6.5 |
| Methyl Trimethoxy Silane (dilute) | 4 | 3.0 |
| Talc | 5 | 3.8 |
| | 134 | 100.1 |

The blending of each of these examples was identical, each of the components being mixed into the silicate solution with continuous stirring. Where no water was added, the potassium silicate initial solution was sufficiently fluid to allow complete mixing. Before surface application, the compositions were shaken for two minutes to provide complete homogeneity.

The surfaces to which the compositions are applied may be metal such as steel or aluminum or plastic. The surfaces may be pretreated as proposed in the commonly assigned co-pending application of John B. Schutt and Charles M. Shai, Ser. No. 452,945, filed May 3, 1965, entitled Alkali Metal Silicate Protective Coatings, now issued as Patent No. 3,454,410 on July 8, 1969.

The compositions of the examples were applied to pre-cleaned aluminum substrates by conventional spray application. After quick air drying, the compositions were tested by water washing and air aging. Both before and after washing and aging, the surfaces were smooth, non-flaking and substantially crack and craze free. They were completely fire resistant and substantially abrasion resistant.

Whereas the primary use of the instant invention is for the interior of space capsules and the like, it may also find application as a general purpose fire-proof coating.

Although the foregoing disclosure relates to preferred embodiments of the invention, it is obvious that numerous modifications and alterations may be made without departing from the spirit and scope of the invention set forth in the appended claims.

What is claimed is:

1. An non-flaking, crack, craze and fire resistant coating composition consisting essentially of from 36–80 parts by weight of potassium silicate-water solution containing 10–24 percent solids having a $SiO_2/K_2O$ mol ratio of about 4.8–5.3; a leach retardant of from 1–10 parts by weight selected from the group consisting of ceric oxide and alkyl trialkoxy silane, the alkyl and alkoxy groups having up to 8 carbon atoms, and mixtures thereof; and 5–15 parts by weight of fibrous calcium silicate wollastonite as a crack and craze resistor.

2. The coating composition according to claim 1, wherein the leach retardant is ceric oxide.

3. The composition of claim 1, which also includes as high temperature crack and craze resistors of up to 10 parts by weight of talc, kaolinite and compositions thereof.

4. The composition of claim 1, which additionally contains a pigment selected from the group consisting of titanium oxide, iron oxide, copper oxide, chromium oxide, manganese oxide, cadmium sulfide and carbon black of up to 60 parts by weight.

5. The composition of claim 1, which additionally includes a filler selected from the group consisting of zinc dust and stainless steel flakes of up to 60 parts by weight.

6. The composition of claim 5, wherein the filler is steel flakes.

7. The composition of claim 1, wherein the alkyl alkoxy silane is methyl trimethoxy silane.

8. The composition of claim 1, wherein the potassium silicate has $SiO_2/K_2O$ ratio of 5.1 and is present in an amount of 100 parts by weight on the basis of 23% solids, the leach retardant is ceric oxide present in an amount of 2 parts by weight and the wollastonite content is 16 parts by weight.

9. The composition of claim 8 additionally contains up to 4 parts by weight methyl trimethoxy silane.

References Cited
UNITED STATES PATENTS

| | | | |
|---|---|---|---|
| 3,364,065 | 1/1968 | Cutright | 117—135.1 |
| 3,389,002 | 6/1968 | Huffcut | 106—84 |
| 3,416,939 | 12/1968 | Schutt et al. | 106—84 |
| 3,423,229 | 1/1969 | Kompanek et al. | 106—84 XR |

JULIUS FROME, Primary Examiner

LORENZO B. HAYS, Assistant Examiner

U.S. Cl. X.R.

106—1, 84; 117—135.1, 137; 252—8.1